(No Model.) 2 Sheets—Sheet 1.
J. H. & S. H. REDFIELD.
MUSIC LEAF TURNER.
No. 504,052. Patented Aug. 29, 1893.
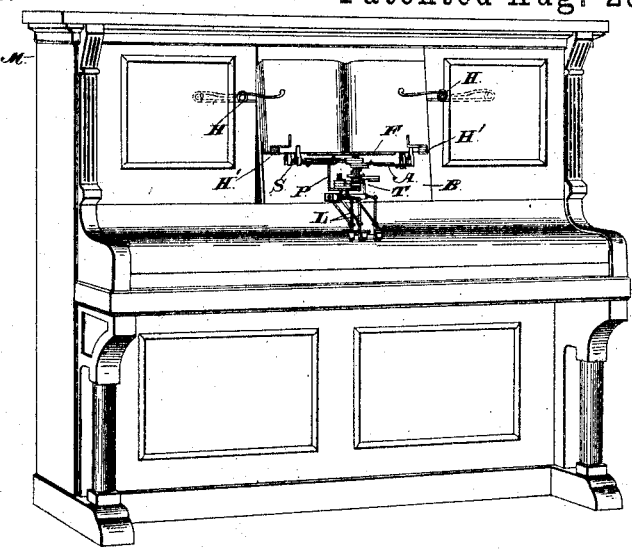
Fig. 1.
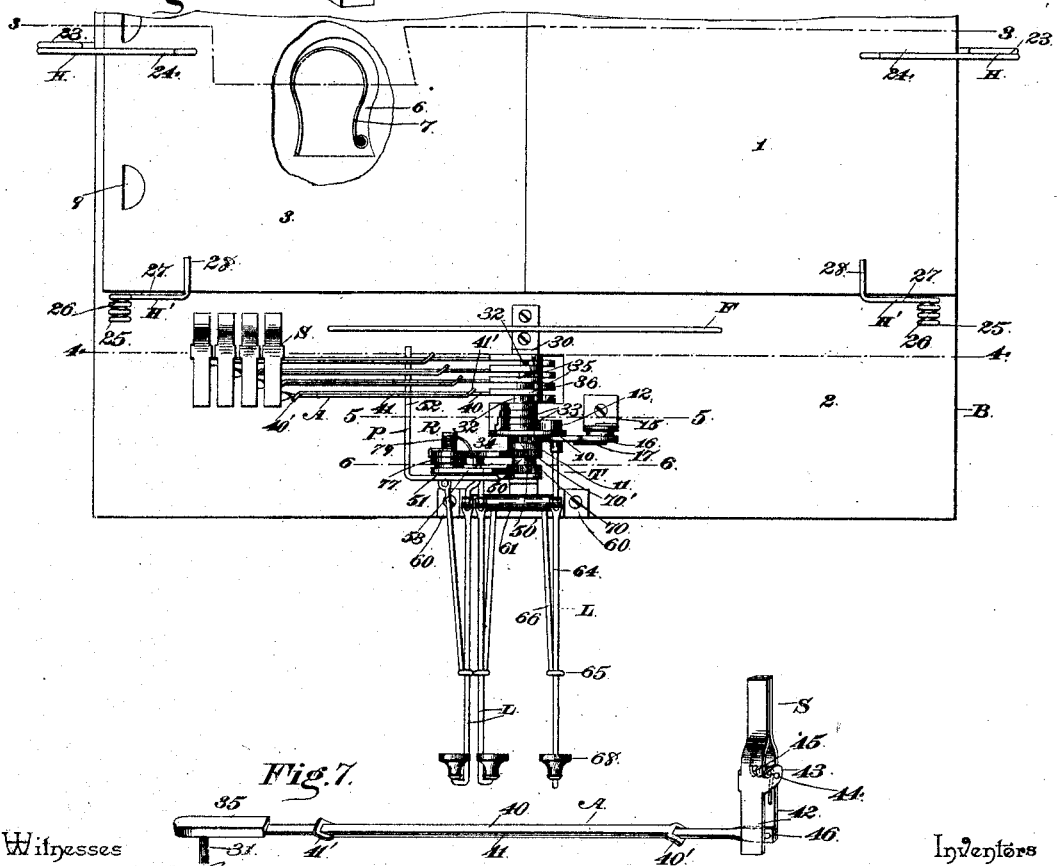
Witnesses
M. Fowler
N. T. Collamer
Inventors
John H. Redfield and
Samuel H. Redfield
By their Attorneys,
C. A. Snow & Co.

(No Model.) 2 Sheets—Sheet 2.
J. H. & S. H. REDFIELD.
MUSIC LEAF TURNER.
No. 504,052. Patented Aug. 29, 1893.
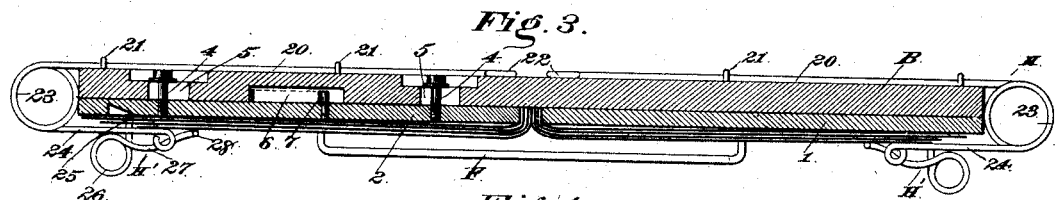
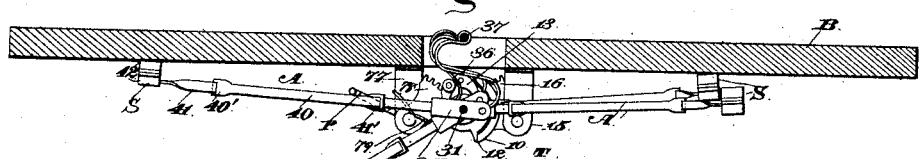
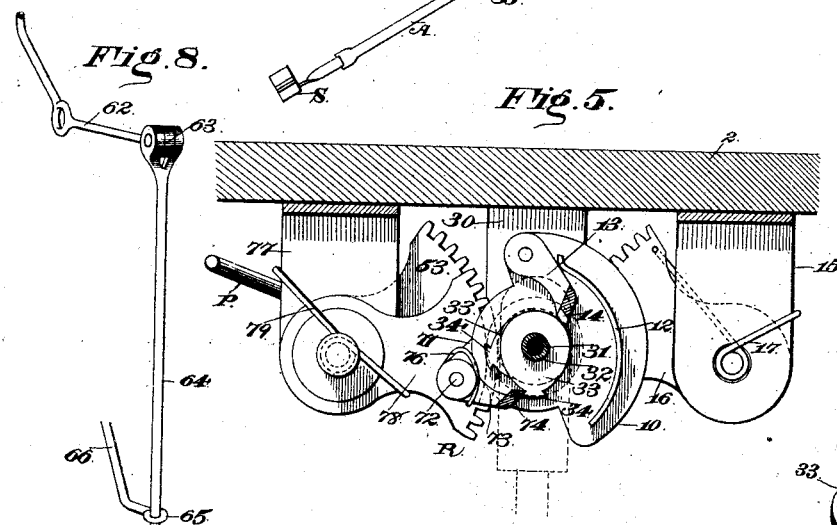
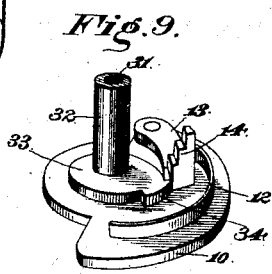
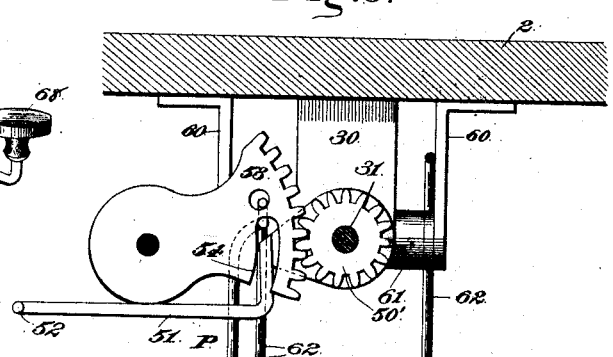
Witnesses
M. Fowler
N. Collamer
Inventors
John W. Redfield
Samuel H. Redfield
By their Attorneys,
C. A. Snow & Co.

UNITED STATES PATENT OFFICE.

JOHN H. REDFIELD AND SAMUEL H. REDFIELD, OF MEDFORD, ASSIGNORS OF ONE-THIRD TO E. E. REDFIELD, OF GRANT'S PASS, OREGON.

MUSIC-LEAF TURNER.

SPECIFICATION forming part of Letters Patent No. 504,052, dated August 29, 1893.

Application filed December 9, 1891. Serial No. 414,516. (No model.)

*To all whom it may concern:*

Be it known that we, JOHN H. REDFIELD and SAMUEL H. REDFIELD, citizens of the United States, residing at Medford, in the county of Jackson and State of Oregon, have invented a new and useful Music-Leaf Turner, of which the following is a specification.

This invention relates to music, and more especially to the devices known as leaf-turners which are adapted to be mounted on pianos or organs to turn the leaves of a book or the sheets of a piece of music when desired; and the object of the invention is to produce certain improvements in devices of this character.

To this end the invention consists in the construction hereinafter more fully described and claimed, and as illustrated on the accompanying two sheets of drawings, wherein—

Figure 1 is a general perspective view of an upright piano with our improved attachment applied thereto, showing a book as supported thereby. Fig. 2 is an enlarged front elevation of the device alone ready to be used for holding a piece of music having several sheets. Fig. 3 is a horizontal section thereof on the line 3—3 of Fig. 2 showing how the back of a piece of music is clamped in place. Fig. 4 is a horizontal section on the line 4—4 of Fig. 2 showing the third leaf as in the act of being turned over. Fig. 5 is a similar section on the line 5—5 of Fig. 2. Fig. 6 is a similar section on the line 6—6 of Fig. 2 showing the piece-repeating mechanism in operation. Fig. 7 is an enlarged perspective detail of one of the leaf-turning arms and its sheet-holding device. Fig. 8 is a similar detail of one of the operating levers. Fig. 9 is an enlarged perspective detail of the so-called "disk" and its pawl, illustrating also one of the sleeves and its ratchet-head.

Referring to the said drawings, the letter M designates a musical instrument such as an organ, or an upright or square piano to which our improved leaf-turner is applied. The turner proper takes the place of the usual music-rack and comprises a back B and a foot F. The covers of a music-book or the first and last sheets of a piece of music are held open by upper holders H and lower holders H'. In brackets carried by the back is journaled a main shaft on which are located a number of nested sleeves each having a ratchet-head at its lower end, and from the upper end of each of which projects horizontally a leaf-turning arm A having a sheet-holding device S at its outer end. The sleeves—and hence the arms—may be turned to the left one at a time by the turning mechanism T best seen in Fig. 4. They may be turned to the right one at a time by the strain-repeating mechanism R best seen in Fig. 5; or they may be turned in that direction *en masse* by piece-repeating mechanism P best seen in Fig. 6; and each of said mechanisms is operated by a lever L of its own having a knob or handle standing just above the key-board and in position to be struck by the operator's hand or finger with hardly any interruption to the playing of the instrument. All of these parts are of the desired size and shape and are susceptible of a considerable degree of modification, but are preferably of about the construction hereinafter more fully described.

At the place usually occupied by the back of an ordinary music-rack is the back B of our improved attachment. This comprises a stationary portion or half 1 mounted on the body 2 and a movable half 3 having screws 4 projecting through horizontal slots 5 in said body and provided with a thumb-hole 9 whereby it can be drawn away from the stationary half as will appear hereinafter. In a socket 6 in the body 2 is located a spring 7 which bears the movable half normally toward the stationary half. The foot F is simply a stout piece of wire arranged as shown at a point below the stationary and movable halves above described; but the construction of this foot is not material. The upper holders H, of which there are preferably two, each consists of a long straight rod 20 sliding through eyes 21 in the back of the body 2 and having an enlargement or head 22 at its inner end. Outside the edge of the body, the rod makes a coil 23, and is then continued in a finger 24 adapted to bear on the face of one of the halves above described. The lower holders H', of which there are preferably two, each consists of a piece of spring-wire seated as at 25 in the face of the body 2, making a spring-coil 26, and then extending into an arm 27 having an upturned extremity 28 adapted to bear against the face of one of the halves near the end of the foot F. This holder holds the lower edge of the book about midway between the binding and the outer edge of a leaf of average size; while the holder H by being adjustable can hold a leaf of any usual width; and both holders, as will be understood, are intended to hold those leaves of a book or piece of music which are not to be turned over by the mechanism described below. The movable half 3 of the back B can be drawn to the left, and the folded binding of a piece of music inserted therein as seen in Fig. 3, the force of the spring 7 holding the music in place; but of course when the music is in book-form, this feature of our invention will not be made use of but reliance will be placed on the upper and adjustable holders H and the lower and non-adjustable holders H' to hold the book against the back and at its proper position on the foot, that is with its binding directly opposite the center of the back.

The leaf-turning arms A (best seen in Fig. 7) are each of the following construction: 40, 41 are straight rods or bars, the uppermost one, 40, having an eye 40' at its outer end engaging the body of the lowermost one, 41, and the latter having a similar eye at its inner end, 41', engaging the body of the first one. In this way the two members are permitted to slide on each other so that the length of the entire arm can be adjusted. The upper and inner member is operated by the devices described below, but the outer member carries the sheet-holding device S which consists preferably of a pair of small flat levers 42 having ears 43 through which extends a pivotal pin 44, and on the latter is wound a spring 45 for keeping the upper ends of the levers normally in contact; while the lower end of one lever is secured rigidly as at 46 to the outer end of the lower member 41 of the arm A, the body of the lower sheet-holding device S standing vertical while the arm A stands approximately horizontal. It will be understood that these sheet-holding devices, which are preferably of metal, are to engage the sheets near the centers of their widths and at their lower edges, as seen in the drawings. 30, 30 are brackets secured to the face of the body 2 and supporting a main shaft 31, and on this shaft are journaled several nested sleeves 32, that is, the smallest sleeve is journaled directly on the shaft, the next larger sleeve on the first, the third on the second, and so on; and these sleeves have at their lower ends ratchet-heads 33 standing adjacent each other, the head of the largest sleeve being at the top of the series of heads. We call these pieces "heads" because they are in reality enlarged heads on the sleeve, and each has a double-faced ratchet or tooth 34 at one side, as best seen in Fig. 9. At the upper end of each sleeve is an arm 35 rigidly mounted thereon exactly above the tooth 34 and from which projects the leaf-turning arm A above described. 36 are S-shaped springs connected with the inner ends of these arms 35 and extending to the rear to a rod 37 carried by the body 2; and as these springs press always directly forward, it is obvious that they will hold the arms normally in either of two positions. The sleeves 32 are adapted to be turned on the shaft by the leaf-turning, strain-repeating, and piece-repeating mechanism described below.

The leaf-turning devices T comprise the following mechanism: 10 is a disk journaled on the main shaft 31 just beneath the lowermost head 33, and 11 is a toothed hub secured to the under side of this disk. 12 is a spring mounted on the disk, and 13 is a pawl borne by the spring normally against the several heads 33, the face of this pawl being stepped as at 14 whereby it engages the lowermost head first and hence moves the uppermost arm A first. To a bracket 15 is pivoted a toothed segment 16 engaging the toothed hub 11 and borne normally toward the body 2 by a spring 17, while it is moved in the opposite direction by one of the operating levers L hereinafter described.

The strain-repeating mechanism R comprises the following devices: 70 is a disk having a toothed hub 70' and journaled on the main shaft 31 beneath the toothed hub 11, and this disk has a radially projecting arm 71 from which rises a pin 72. On this pin is journaled a pawl 73 whose face rises alongside the several heads 33 and is stepped as seen at 74 oppositely to the face 14 of the pawl 13, that is so that this pawl will engage the uppermost head first and hence move the lowermost arm A first. The stepped face is borne normally against said heads by a spring 76. 77 is a bracket carried by the body 2 and wherein is journaled a toothed segment 78 which engages the geared hub 70', the segment being borne toward the body 2 by a spring 79, while it is adapted to be moved in the opposite direction by one of the operating levers L hereinafter described.

The piece-repeating mechanism P is of the following construction: 50 is a disk having a toothed hub 50' and journaled on the main shaft 31 below the disk 70 just described, and 51 is an arm projecting radially from this disk 50 and turned up as at 52 at its outer end where it extends behind the several arms A when they are turned over to the left. 53 is a toothed segment pivoted in the bracket 77 and engaging the geared hub 50', but this segment has a slot 54 wherein fits the upper end of the lever L which moves the strain-repeating mechanism, as best seen in Fig. 6. This segment is therefore borne to the rear by the force of the spring 79 moving the segment 78 which moves the segment 53, and the latter is moved in the opposite direction by one of the levers L which we will now describe. The slot in the segment 53 receives the lever of the segment 78, and the latter is thereby permitted an independent movement, but when the segment 53 is moved the inner wall of the slot engages the said lever and thereby actuates the segment 78. 60, 60 are two brackets carried by the body 2 and supporting a horizontal rod 61 on which is mounted each of the operating levers L. The latter each consists of a bell-crank lever 62 whose upper end engages the segment which it is to move, whose angle is mounted on the horizontal rod, and whose front end has an eye 63. 64 is a vertical rod having a pair of eyes pivotally connected to the eye 63, the body of this rod sliding through an eye 65 in the lower end of a brace 66 depending from the body 2, and the lower end of the rod having a knob, button, or handle 68 of a shape and size to be struck by the operator while playing without removing her fingers or hands far from the keyboard.

With the above construction of parts, the operation of this device is as follows: The book or piece of music is placed on the foot F and under the holders H', the holders H being adjusted laterally so as to go over the outer edges of the sheets which are not to be turned. If the music is in sheet form, the binding is clamped between the halves 1 and 3 as above described. The sheet-holding devices S are engaged with the lower edges of the several sheets, the arms A being adjusted in length so as to bring the point of engagement the desired distance from the center of the rack B. The operator having played the music on the first page and being desirous of turning the same to the left, she strikes the right-hand knob 68, thereby moving its lever L around the horizontal rod 61, throwing the toothed segment 16 forward, turning the disk 10, and thereby causing the pawl 13 to move into engagement with the tooth 34 on the lowermost head 33, which turns the uppermost arm A to the left. In the same manner any or all of the pages can be turned in this direction. When it is desired to repeat a strain part of which may be on the other side of the leaf last turned over, the left-hand knob 68 is depressed. In the same manner this turns the toothed segment of the strain-repeating mechanism, turns its gear, and moves its pawl so that its stepped face engages the tooth 34 on the last head which has been turned to the left, and this head and the sheet carried by its arm A are turned back to the right as is desired. When it becomes desirable to repeat the entire piece, the center knob 68 is depressed. In a similar manner this turns the toothed segment of the piece-repeating mechanism, turns its gear, and moves its arm 51 so that the turned-up end 52 thereof moves back to the right all the arms A which have been turned over to the left.

Thus it will be seen that we have produced a device capable of turning the leaves of a book or the sheets of a piece of music in either direction and whenever desired without removing the hands far from the keyboard, and without the loss of time or the expenditure of much force. The machine above described can be made ornamental to a considerable extent if desired, and various changes in and elaborations of the details of construction can be made without departing from the spirit of our invention.

What is claimed as new is—

1. The combination with the leaf turning mechanism of a music rack comprising a foot, and a back consisting of a stationary half, a movable half having screws projecting loosely through horizontal slots in the body of the back, the latter having a socket, and a spring located in said socket and having one end connected to the movable half, and music clamping devices mounted on the rack substantially as described.

2. In a leaf-turner, the combination with a pair of brackets connected by an upright rod, and a back and foot; of disks mounted on said rod, pawls connected with the disks, means for operating the latter, sleeves having heads engaged by said pawls, arms projecting from said sleeves, and sheet-holding devices at the outer ends of said arms, as and for the purpose set forth.

3. In a leaf-turner, the combination with a vertical rod, nested sleeves thereon, a leaf-turning arm projecting from the upper end of each sleeve, and a head at the lower end of each sleeve having a double-faced tooth; of a disk journaled on said rod, a spring-actuated pawl on said disk having a stepped face adapted to engage the lowermost tooth first, a second disk journaled on said rod, a spring-actuated pawl on this disk having an oppositely stepped face adapted to engage the uppermost tooth first, and means for independently oscillating said disks, substantially as described.

4. In a leaf-turner, the combination with a vertical rod, nested sleeves thereon, a leaf-turning arm projecting from the upper end of each sleeve, a spring bearing the arm in one direction, and a head at the lower end of each sleeve, said head having a tooth; of a disk journaled on said rod, a spring-actuated pawl connected with said disk and having a stepped face adapted to engage the lowermost tooth first, and means for oscillating the disk, substantially as described.

5. In a leaf-turner, the combination with a vertical rod, nested sleeves thereon, a leaf-turning arm projecting from the upper end of each sleeve, a spring bearing the arm in one direction, and a head at the lower end of each sleeve, said head having a tooth; of a disk journaled on said rod, a spring-actuated pawl connected with said disk and having a stepped face adapted to engage said teeth successively, a gear on the hub of said disk, a toothed segment engaging said gear, a spring bearing said segment in one direction, and a lever for moving it in the opposite direction, substantially as described.

6. In a leaf-turner, the combination with an upright rod, a sleeve thereon, a leaf-turning arm carried by said sleeve, the latter having a head provided with a tooth, and a pawl adapted to engage said tooth; of a horizontal rod below the upright rod, a bell-crank lever mounted at its angle on said horizontal rod, a rod having a knob at its lower end, its body moving through a suitable guide, and its upper end being connected with one arm of said lever, and connections substantially as described between the other arm of said lever and the pawl, as and for the purpose set forth.

7. In a leaf-turner, the combination with a vertical rod, a sleeve thereon, a leaf-turning arm carried by said sleeve, a spring bearing the arm in one direction, and a head on said sleeve having a tooth; of a disk journaled on the rod, a spring-actuated pawl connected with the disk and adapted to engage said tooth, a gear on the hub of said disk, a pivoted segment having a toothed face engaging said gear, a horizontal rod below the segment, a bell-crank lever mounted at its angle on said rod, its upper end being loosely connected with the segment, a rod depending from its lower end, and a knob at the lower end of said pendent rod, as and for the purpose set forth.

8. In a leaf-turner, the combination with an upright rod, a sleeve thereon, an arm carried by said sleeve, an S-shaped spring holding said arm yieldingly in either of two positions, a leaf-turning arm projecting from said arm, and a head on said sleeve having a double-faced tooth; of two pivoted segments, one on each side of said rod, independent means for operating said segments, spring-actuated pawls adapted to engage the opposite faces of said tooth, and connections substantially as described between each pawl and one of the segments, as and for the purpose set forth.

9. In a leaf-turner, the combination with an upright rod, nested sleeves thereon, a leaf-turning arm projecting from the upper end of each sleeve, and a head at the lower end of each sleeve having a double-faced tooth; of three disks journaled on said rod, spring-actuated pawls connected with two of said disks and having oppositely stepped faces engaging the opposite faces of said teeth, an arm projecting from the third disk and having an upturned end adapted to engage all of said leaf-turning arms, and means for independently oscillating said disks, as and for the purpose set forth.

10. In a leaf-turner, the combination with an upright rod, sleeves journaled thereon, and leaf-turning arms carried by said sleeves; of a disk journaled on said rod and having a geared hub, an arm projecting from this disk and having an upturned end adapted to engage all of said leaf-turning arms, a second disk having a geared hub, connections between this disk and said sleeves, pivoted segments having toothed faces respectively engaging said hubs, and levers for oscillating said segments, one of the latter being slotted for the passage of the lever which operates the other segment, as and for the purpose set forth.

In testimony that we claim the foregoing as our own we have hereto affixed our signatures in the presence of two witnesses.

JOHN H. REDFIELD.
SAMUEL H. REDFIELD.

Witnesses:
I. L. HAMILTON,
M. PURDIN.